(12) United States Patent
McCain et al.

(10) Patent No.: US 11,852,725 B2
(45) Date of Patent: Dec. 26, 2023

(54) SYSTEM AND METHOD FOR DETERMINING AN ELEVATION OF A LASER DETECTOR

(71) Applicant: Topcon Positioning Systems, Inc., Livermore, CA (US)

(72) Inventors: Steven Daniel McCain, Tracy, CA (US); Jay Kishore Nagin, Davis, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 797 days.

(21) Appl. No.: 16/721,992

(22) Filed: Dec. 20, 2019

(65) Prior Publication Data

US 2020/0256998 A1    Aug. 13, 2020

Related U.S. Application Data

(60) Provisional application No. 62/803,152, filed on Feb. 8, 2019.

(51) Int. Cl.
| | |
|---|---|
| G06F 3/01 | (2006.01) |
| G01S 17/66 | (2006.01) |
| E01C 19/00 | (2006.01) |
| G01S 7/481 | (2006.01) |
| G01S 7/497 | (2006.01) |

(52) U.S. Cl.
CPC ............ G01S 17/66 (2013.01); E01C 19/006 (2013.01); G01S 7/4811 (2013.01); G01S 7/4972 (2013.01)

(58) Field of Classification Search
CPC ....... G01S 17/42; G06Q 10/087; B66F 9/063; G06T 7/73; G05B 13/027; B25J 9/1612
USPC ....................... 342/357.09; 701/50
See application file for complete search history.

(56) References Cited

U.S. PATENT DOCUMENTS

| | | | |
|---|---|---|---|
| 4,029,415 | A | 6/1977 | Johnson |
| 4,030,832 | A | 6/1977 | Rando et al. |
| 4,273,225 | A | 6/1981 | Swanson |
| 5,756,987 | A | 5/1998 | Kamataki |
| 6,384,725 | B1 | 5/2002 | Dong |

(Continued)

FOREIGN PATENT DOCUMENTS

| | | |
|---|---|---|
| DE | 202010014183 U1 | 12/2010 |
| JP | 6471904 A | 3/1989 |
| WO | 9809136 A1 | 3/1998 |

OTHER PUBLICATIONS

International Search Report and Written Opinion dated May 11, 2020, in connection with International Patent Application No. PCT/US2020/016319, 13 pgs.

(Continued)

*Primary Examiner* — Phuoc H Doan
(74) *Attorney, Agent, or Firm* — CHIESA SHAHINIAN & GIANTOMASI PC

(57) ABSTRACT

A method for determining an elevation of a laser detector assembly includes calculating an estimated elevation of a laser detector assembly based on data from an inertial measurement unit and a detected laser strike. The estimated elevation is then output. A detected elevation of the laser detector assembly is calculated based on the detected laser strike and the detected elevation is output in response to the detected laser strike. The estimated elevation is calculated and output between outputs of detected elevations.

20 Claims, 5 Drawing Sheets

(56) References Cited

U.S. PATENT DOCUMENTS

| | | |
|---|---|---|
| 6,691,437 B1 | 2/2004 | Yost et al. |
| 7,448,138 B1 | 11/2008 | Vanneman |
| 2002/0162233 A1 | 11/2002 | El-Katcha et al. |
| 2003/0006048 A1 | 1/2003 | Marriott, Jr. et al. |
| 2005/0212702 A1* | 9/2005 | Brabec .................. G01S 19/14 |
| | | 342/357.57 |
| 2006/0008323 A1 | 1/2006 | Torvinen |
| 2006/0087641 A1* | 4/2006 | Burkhart ................ G01C 3/08 |
| | | 356/5.01 |
| 2008/0087447 A1 | 4/2008 | Piekutowski |
| 2008/0109141 A1* | 5/2008 | Nichols ................. E02F 3/842 |
| | | 701/50 |
| 2015/0226639 A1 | 8/2015 | Cavanaugh et al. |
| 2016/0223364 A1 | 8/2016 | Peters et al. |
| 2017/0123066 A1 | 5/2017 | Coddington et al. |
| 2018/0372498 A1 | 12/2018 | Nackers et al. |

OTHER PUBLICATIONS

International Search Report and Written Opinion dated May 18, 2020, in connection with International Patent Application No. PCT/US2020/016323, 12 pgs.

Non-Final Office Action dated Jul. 6, 2022 in connection with U.S. Appl. No. 16/721,981, filed Dec. 20, 2019, 25 pgs.

Non-Final Office Action dated Feb. 27, 2023 in connection with U.S. Appl. No. 16/721,981, filed Dec. 20, 2019, 23 pgs.

Notice of Reasons for Refusal dated Oct. 24, 2023 in connection with Japanese Patent Application No. 2021-546219, 22 pgs. (including translation).

\* cited by examiner

SYSTEM AND METHOD FOR DETERMINING AN ELEVATION OF A LASER DETECTOR

CROSS-REFERENCE TO RELATED APPLICATIONS

This application claims the benefit of U.S. Provisional Patent Application No. 62/803,152, filed Feb. 8, 2019, the entire contents of which are incorporated herein by reference.

FIELD OF THE INVENTION

The present invention relates generally to machine control and operation, and more particularly to determining an elevation of a laser detector and for providing elevation information at a rate faster than a frequency of laser strikes impinging the laser detector.

BACKGROUND

Machines used for construction can use rotating laser systems for determining elevation (e.g., height with respect to a reference) of the machine and/or implements of the machine. FIG. 1A depicts a rotating laser system that includes laser transmitter 140 outputting laser beam 128 that is rotated about a vertical axis of laser transmitter 140. Mirrors, optical components, and/or mechanical components of the laser transmitter cause the laser to be rotated in a laser reference plane having a known elevation 132. Laser detector 112 is attached to mast 114. Laser detector 112 detects laser beam 128 as it impinges on one of a plurality of laser detector elements (116 shown in FIGS. 1B and 1C) of laser detector 112 as is well known in the prior art. Laser beam 128 impinging on one of the plurality of laser detector elements is referred to as a laser strike. Laser detector elements can be photoreceptors, photodiodes, or other types of sensors that can detect laser beam 128. Mast 114 is attached to implement 120 of machine 110, such as a bulldozer as shown in FIG. 1A. Elevation of laser detector 112 is determined with respect to laser beam 128 and the elevation of implement of the machine can be determined based on the elevation of laser detector 112 since the distance from implement 120 to laser detector 112 is known. The output rate of the laser detector is the frequency at which elevation data is output from the laser detector. The output rate of the laser detector is directly related to the rate at which laser strikes are detected by laser detector 112. A typical laser transmitter rotates a laser in a laser reference plane at 600 rpm (10 Hz) which translates to 100 milliseconds between each rotation, therefore the laser detector detects laser strikes at a rate of 10 Hz. As such, the laser detector outputs information pertaining to a laser strike at the same rate at which the laser is detected, which in this example, is 10 Hz. Elevation of the laser detector during the time period between laser strikes is not detected.

FIG. 1B depicts laser beam 128 impinging one of the plurality of laser detector elements located near a vertical center of laser detector 112. FIG. 1C depicts laser beam 128 impinging one of the plurality of laser detector elements 116 located near the lower end of laser detector 112. This scenario occurs when laser detector 112 has moved, in this example, upward relative to laser beam 128. Similarly, when laser detector 112 has moved downward relative to laser beam 128, one of laser detector elements 116 located near the upper end of laser detector 112 will detect laser beam 128. As can be seen in FIGS. 1B and 1C, laser beam 128 can only be detected when laser beam 128 impinges on one of plurality of laser detector elements 116.

What is needed is a method and system for providing elevation information at a rate faster than the rate at which laser strikes are detected.

SUMMARY

A method for determining an elevation of a laser detector assembly includes calculating an estimated elevation of a laser detector assembly based on data from an inertial measurement unit and a detected laser strike. The estimated elevation is then output. In one embodiment, a detected elevation of the laser detector assembly is calculated based on the detected laser strike and the detected elevation is output in response to the detected laser strike. The estimated elevation is calculated and output between outputs of detected elevations. In one embodiment, the frequency at which the estimated elevation is calculated and output is the same frequency at which detected elevations are calculated and output. The estimated elevation can be output 180 degrees out of phase to the output of the detected elevations. In one embodiment, the estimated elevation of the laser detector assembly is calculated and output at a frequency higher than a frequency of laser strikes.

DETAILED DESCRIPTION

Figure 2:
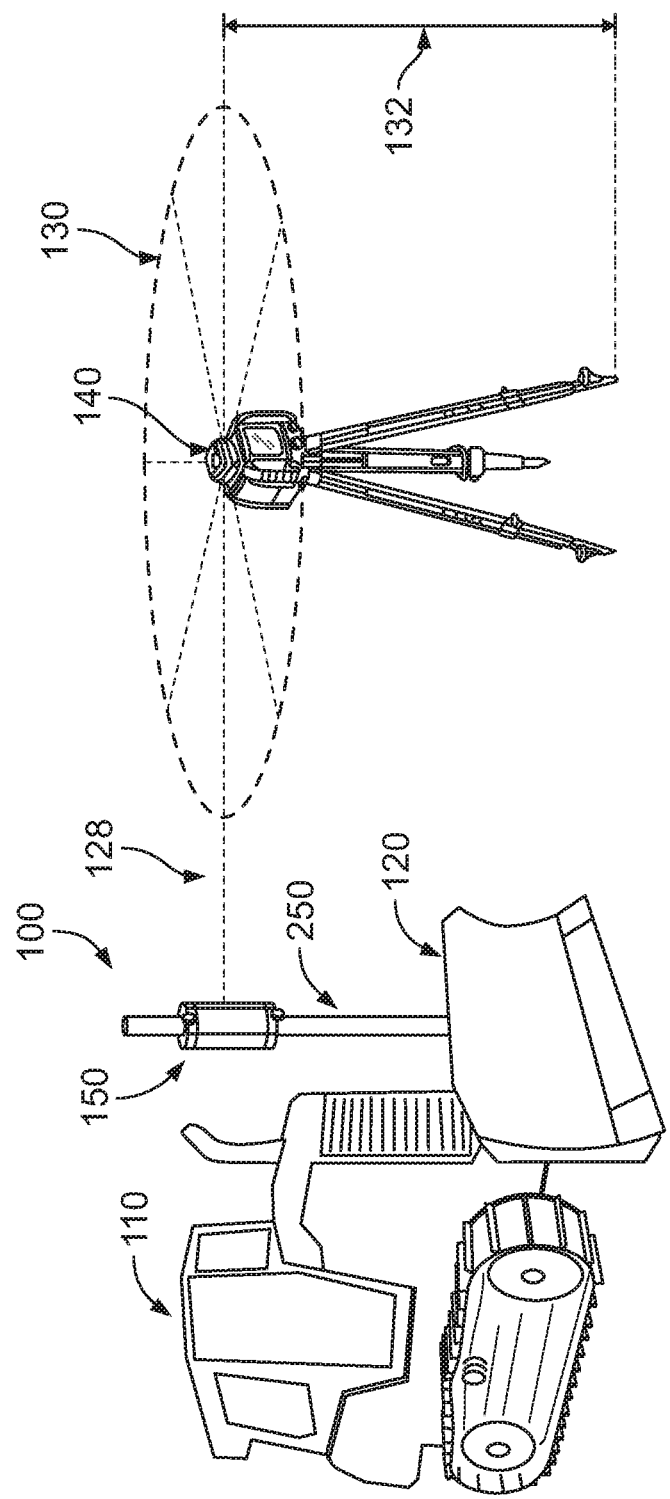
FIG. 2 depicts a laser detector assembly in according to an embodiment.

FIG. 2 depicts laser transmitter 140 which outputs laser beam 128. In one embodiment, laser transmitter 140 outputs laser beam 128 which is rotated about a substantially vertical axis thereby forming substantially horizontal laser reference plane 130. In one embodiment, laser transmitter 140 can be programmed to tilt the horizontal reference plane 130 in order to account for a vertical axis that is not perfectly vertical (i.e., not perfectly plumb) Transmitter 140 can also be programmed to output a sloped laser reference plane in order to indicate a desired slope for a surface to be modified. In one embodiment, an elevation of laser transmitter 140 is known. As such, elevation 132 of laser reference plane 130 is also known. Such rotating lasers are well known in the art.

Laser beam 128 is detected by laser sensor 150 of laser detector assembly 100 which, in one embodiment, comprises laser sensor 150 and mast 250 (described in detail below). Laser detector assembly 100 is mounted to implement 120 of machine 110, which, in this example, is a blade of a bulldozer. Machine 110, in one embodiment, is used to modify a surface according to the horizontal laser reference plane 130 established by laser transmitter 140. In one embodiment, machine 110 is used to modify a surface in accordance with a desired site plan using horizontal laser reference plane 130 as a reference.

In one embodiment, an elevation of laser sensor 150 is determined based on a location at which a laser beam impinges on laser sensor 150 (referred to as a laser strike) and based on data from an inertial measurement unit. Use of the inertial measurement unit allows elevation of laser sensor 150 to be determined at a frequency greater than the frequency at which laser beam 128 is detected by laser sensor 150.

Laser detector assembly 100 includes mast 250 that extends vertically from implement 120 and is used as a support for laser sensor 150. Laser sensor 150 can be moved along mast 250 manually and fixed in a desired location along mast 250. Laser sensor 150 can also be moved along mast 250 by a motor that can be actuated by a user at mast 250 or remotely. In one embodiment, laser sensor 150 is approximately 150 millimeters in height and comprises a plurality of laser detector elements (310 shown in FIG. 3) configured in a line of photodiodes or an array of photodiodes. In other embodiments, laser sensor can comprise other types of sensors and can have a height ranging from approximately 150 millimeters to 250 millimeters.

Figure 3:
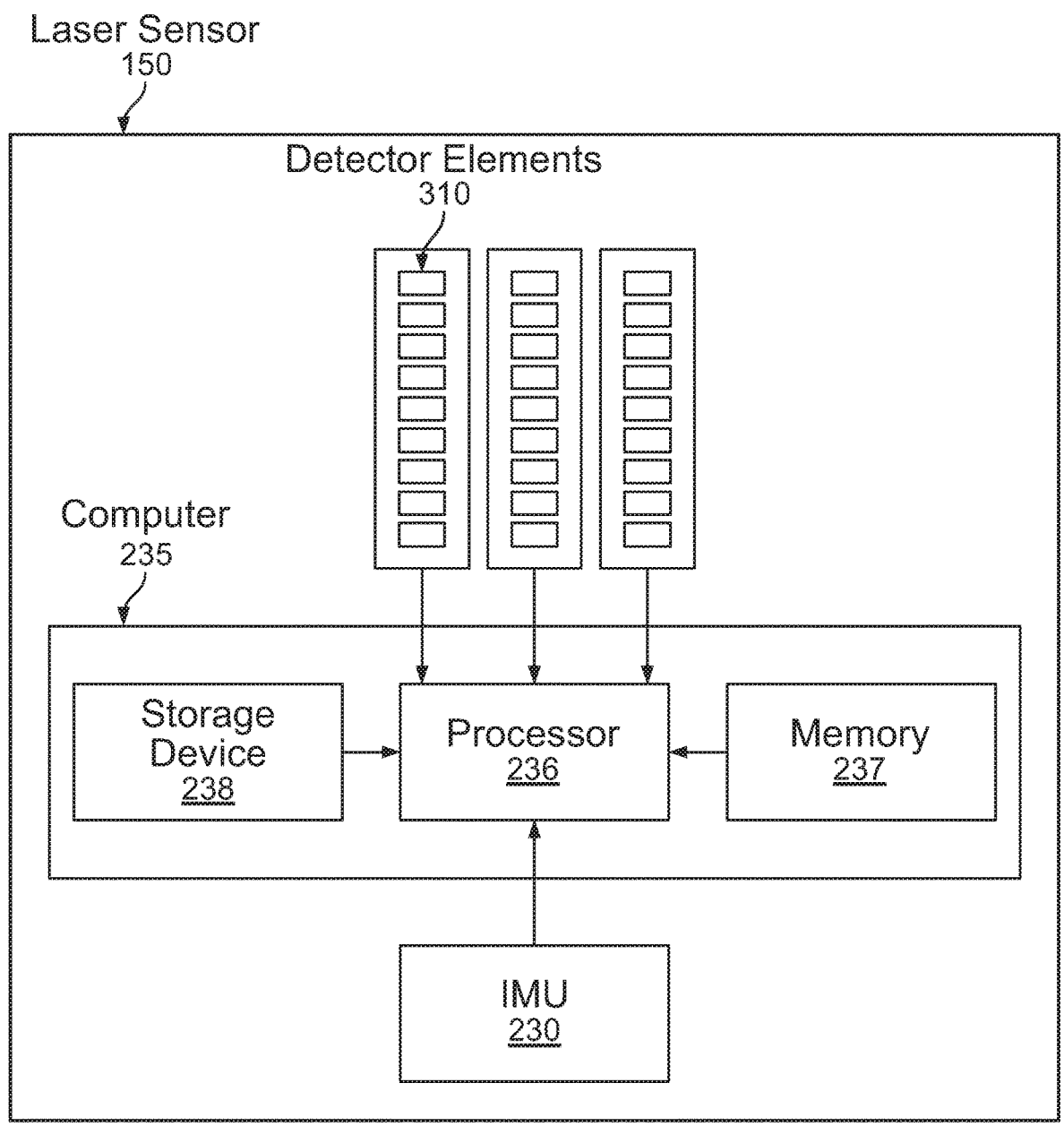
FIG. 3 depicts a schematic of a laser detector assembly in accordance with an embodiment.

FIG. 3 is a schematic depiction of laser detector assembly 100. Laser sensor 150 includes a plurality of laser detector elements 310 that transmit position data to computer 235. In one embodiment, computer 235 analyzes the position data from laser detector elements 310 and determines a vertical location of the laser along the vertical axis of laser sensor 150 at which laser beam 128 was impinging. For example, a detector element (of a plurality of laser detector elements 310 shown in FIG. 3) located at the vertical center of laser sensor 150 detecting laser 128 indicates that laser beam 128 is impinging approximately at the vertical center of laser sensor 150. Similarly, a detector element at one end of laser sensor detecting laser beam 128 indicates that laser beam 128 is impinging at a respective end of laser sensor 150.

Computer 235 receives data from laser detector elements 310 and determines a location of the laser along the vertical axis of laser sensor 150. Computer 235 contains a processor 236 which controls the overall operation of the computer 235 by executing computer program instructions which define such operation. The computer program instructions may be stored in a storage device 238, or other computer readable medium (e.g., magnetic disk, CD ROM, etc.), and loaded into memory 237 when execution of the computer program instructions is desired. Thus, the method steps of FIG. 6 can be defined by the computer program instructions stored in the memory 237 and/or storage device 238 and controlled by the processor 236 executing the computer program instructions. For example, the computer program instructions can be implemented as computer executable code programmed by one skilled in the art to perform algorithms defined by the method steps of FIG. 6. Accordingly, by executing the computer program instructions, the processor 236 executes an algorithm defined by the method steps of FIG. 6. Computer 235 can also include one or more network interfaces (not shown) for communicating with other devices via a network, input/output devices that enable user interaction with the computer 235 (e.g., display, keyboard, mouse, speakers, buttons, etc.) One skilled in the art will recognize that an implementation of an actual computer could contain other components as well, and that computer 235 of FIG. 3 is a high level representation of some of the components of such a computer for illustrative purposes. Elevation data calculated by computer 235 (as described in detail below) can be transmitted to other devices, such as a machine control indicator (not shown) associated with operation of machine 110 (shown in FIG. 2). Transmission of data from computer 235, in one embodiment, can be wired or wireless and facilitates automation of operation of a machine, such as machine 110 shown in FIG. 2. For example, actuation of implement 120 by machine 110 can be automated to use elevation data calculated by computer 235 to modify a surface based on a desired grade.

Inertial measurement unit ("IMU") 230 is in communication with processor 236. IMU 230 senses movement of laser detector assembly 100 (specifically, laser sensor 150) using one or more accelerometers (e.g. 3-axis accelerometer) and/or gyroscopes (e.g. 3-axis gyroscope). In one embodiment, laser detector assembly 100 is attached to implement 120 of machine 110. As such, IMU detects movement of implement 120 however implement 120 is moved. For example, implement can be moved by an operator of machine 110 actuating implement 120. Implement 120 can also move based on movement of machine 110 over a surface. IMU 230 can determine movement from a reference position. Movement from a reference position allows for a new position of IMU 230 to be calculated.

Figure 4:
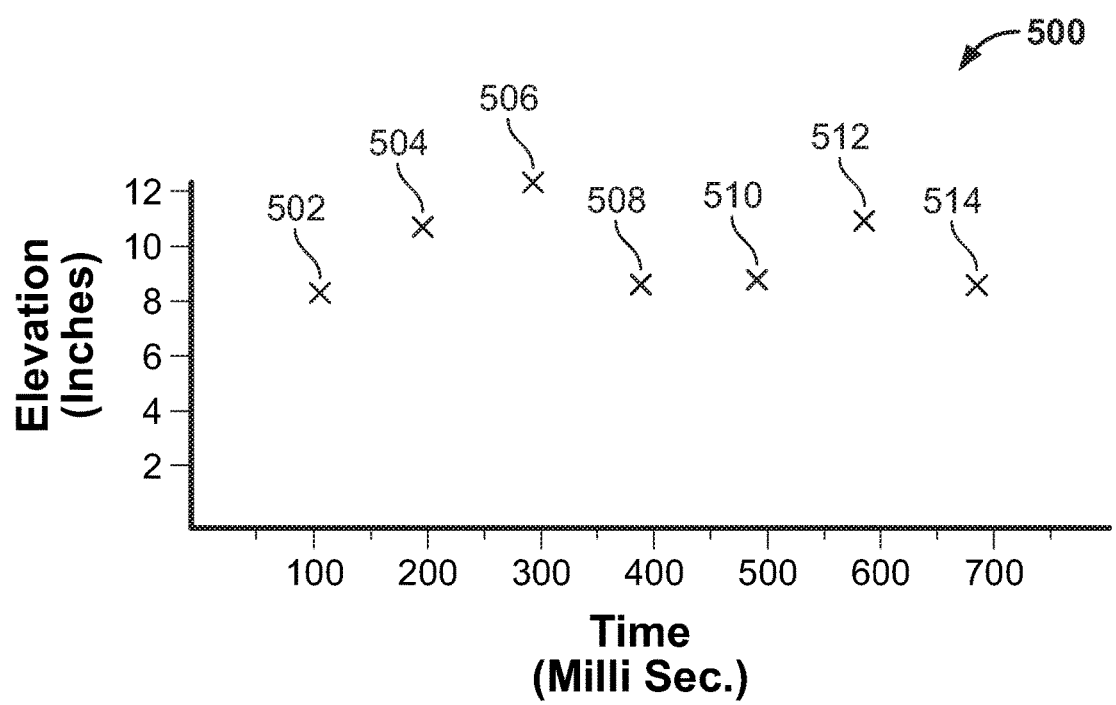
FIG. 4 depicts a graph showing elevation of a laser detector assembly calculated based on laser strikes.
Figure 5:
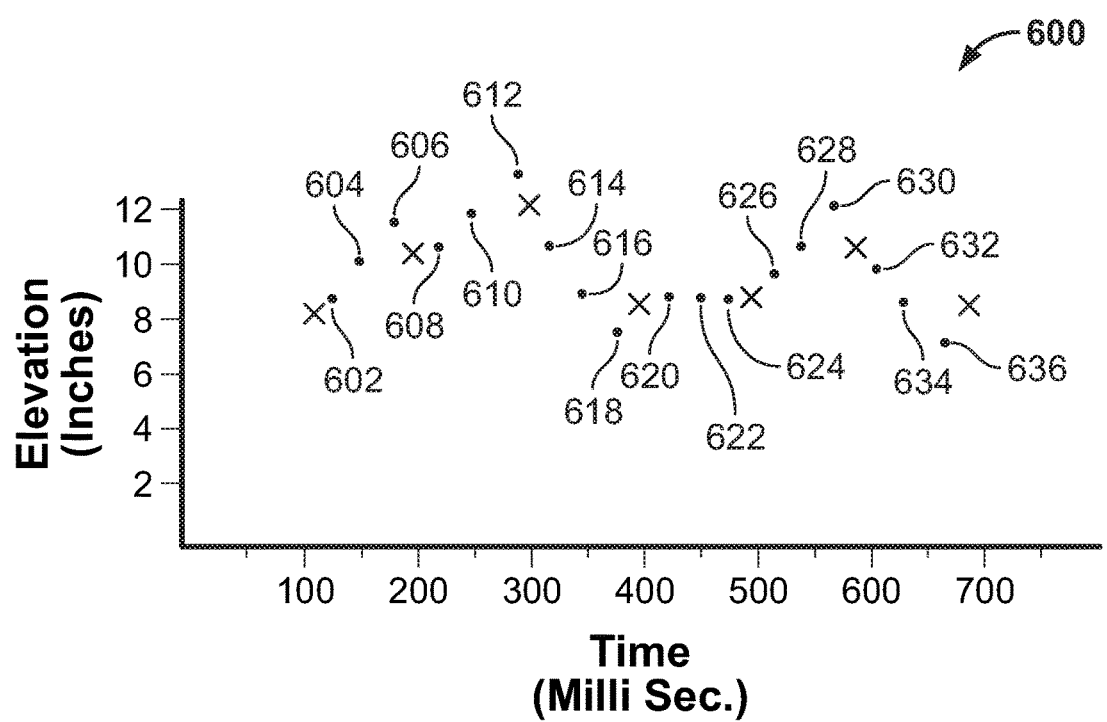
FIG. 5 depicts a graph showing elevation of a laser detector assembly calculated based on laser strikes and data from an inertial measurement sensor.
Figure 6:
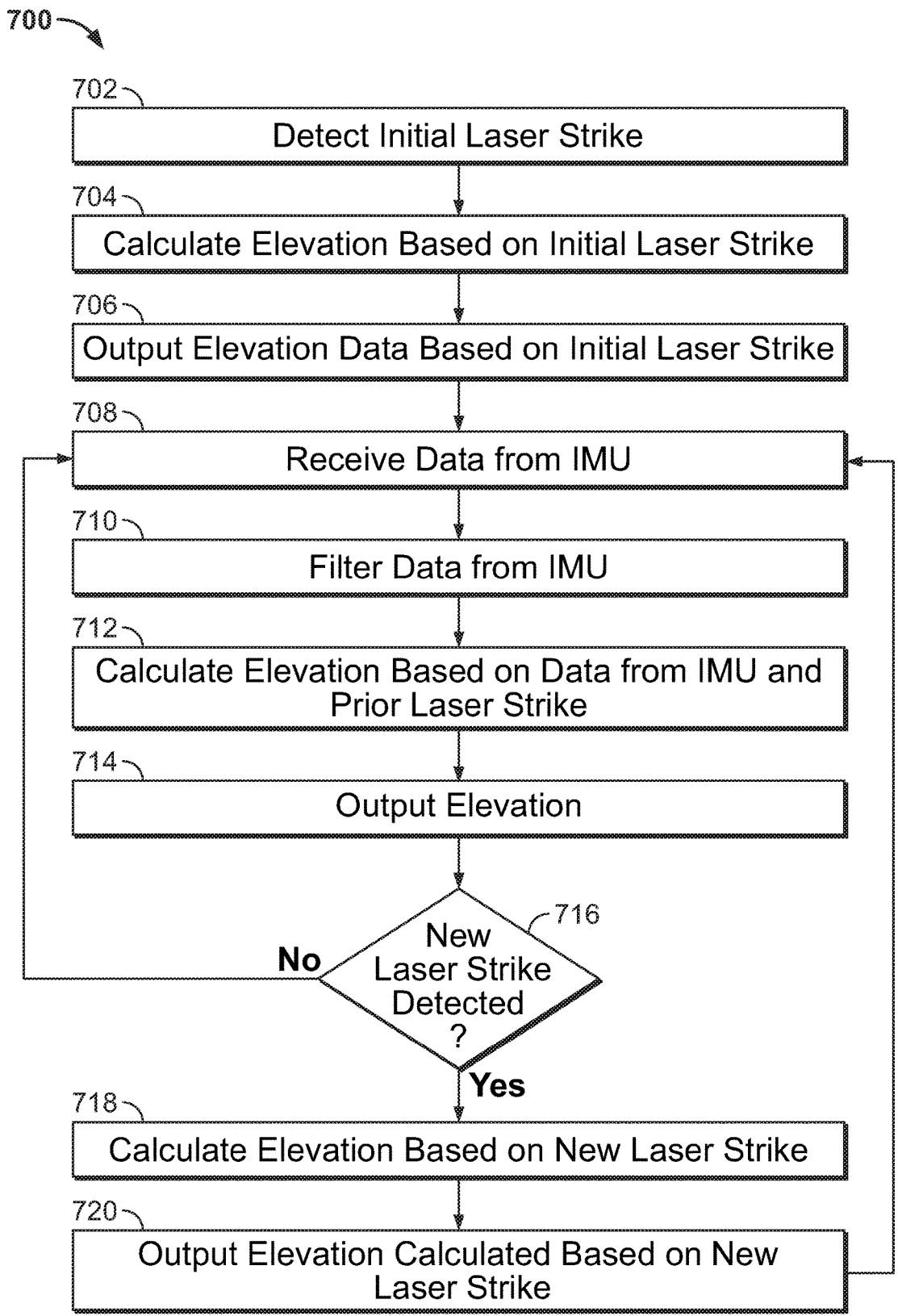
FIG. 6 depicts a flow chart of a method for determining an elevation of a laser detector assembly according to an embodiment.

FIG. 4 depicts graph 500 showing detected elevation values calculated, in one embodiment, by computer 235 based on laser strikes (described in detail below in connection with FIG. 6). Graph 500 has a vertical axis associated with elevation of laser 128 impinging laser sensor 150 in inches and a horizontal axis associated with time in milliseconds. As shown in FIG. 5, at 100 milliseconds, an elevation of laser 128 is identified as 8 inches as shown by detected elevation marker 502 (i.e., an "X"). At 200 milliseconds, the detected elevation of laser detector assembly 100 is identified as 10 inches by detected elevation marker 504. Similarly, the detected elevation of laser 128 is identified by elevation markers 506-514 at later times. The elevation of laser detector assembly 100 can be determined based on the elevation of laser 128 impinging on laser sensor 150 as described above.

FIG. 5 depicts graph 600 showing both detected elevation markers (with the labels shown in FIG. 4 omitted from FIG. 5 for clarity) and estimated elevation markers 602-636. Graph 600 has a vertical axis associated with elevation of laser 128 impinging on laser sensor 150 in inches and a horizontal axis associated with time in milliseconds. Each of estimated elevation markers 602-636 is represented by a filled circle (i.e., a dot). Each of elevation markers 602-636 represent a value for an estimated elevation at a particular time. In one embodiment, an estimated elevation is based on a prior laser strike and data from IMU 230. For example, detected elevation marker 502 identifies an elevation value that was calculated based on a laser strike. Estimated elevation marker 602 identifies an elevation value that was calculated based on the laser strike and data from IMU 230 pertaining to a change in elevation of a laser strike determined after a laser strike has occurred. As shown in FIG. 5, estimated elevation markers 602, 604 and 606 identify an increasing elevation of the estimated elevation. After a subsequent laser strike is detected, a new detected elevation is determined based on the subsequent laser strike, the value of which is identified by detected elevation marker 504. As shown in FIG. 5, estimated elevation marker 606 has an elevation value greater than detected elevation marker 504. The elevation value of elevation marker 504 is calculated based on a laser strike. As such, drift or deviation of estimated elevation values based on prior laser strikes and data from IMU 230 are prevented from continuing to drift because a detected elevation value is calculated based on each laser strike. As shown in FIG. 5, drift of estimated elevation values 608, 610, and 612 are prevented from continuing to drift when a detected elevation value is calculated such as the value identified by, for example, detected elevation marker 506.

As shown in FIG. 5, elevation of laser detector assembly 100 can be determined using data from IMU 230. As such, elevation of laser detector assembly 100 can be calculated during the time period in between laser strikes.

Figure 1A:
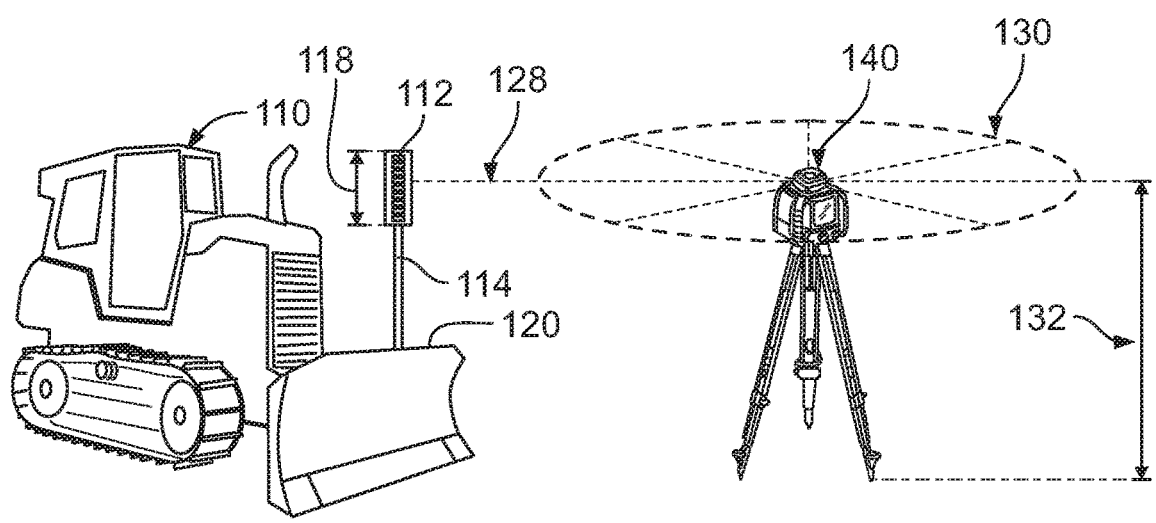
FIG. 1A depicts a rotating laser system for determining elevation.
Figure 1B:
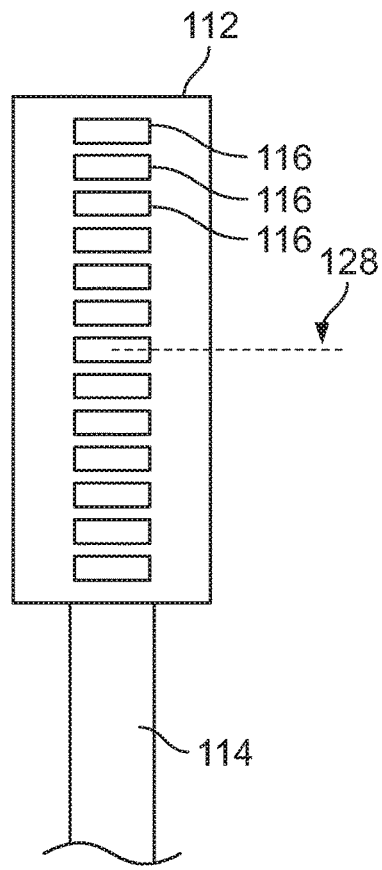
FIG. 1B depicts a laser detector with a laser beam impinging one of a plurality of laser detector elements.
Figure 1C:
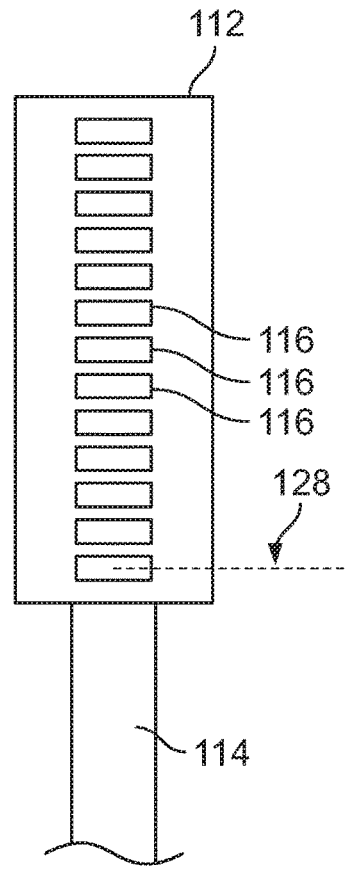
FIG. 1C depicts the laser detector of FIG. 1B with a laser beam impinging a different one of a plurality of laser detector elements.

As shown in FIGS. 4 and 5, and described herein, data from IMU 230 is received and elevations can be calculated by computer 235 based on data from IMU 230 at a frequency higher than the frequency of laser strikes. As such, each laser strike can be used as a reference to calculate an elevation of laser detector assembly 100 and data from IMU 230 can be used to calculate the elevation of laser detector assembly 100 during the time period between laser strikes. This facilitates output of elevation data from laser detector assembly 100 to other devices (such as a machine controller associated with a machine 110 shown in FIG. 1A) at a frequency higher than the frequency of laser strikes. The higher frequency output of elevation data allows more accurate control of a machine (e.g., machine 110).

In one embodiment, laser detector assembly 100 determines an elevation based on laser beam 128 impinging on laser detector elements 310 of laser sensor 150 and data from IMU 230. FIG. 6 depicts a flow chart of a method for determining an elevation of laser detector assembly 100 according to one embodiment. In one embodiment, the method is performed by processor 236 of laser detector assembly 100. At step 702 an initial laser strike is detected. At step 704, an elevation of laser detector assembly 100 is calculated based on the initial laser strike. At step 706, the elevation of laser detector assembly 100 calculated at step 704 is output from processor 236. The calculated laser strike elevation is also referred to as a detected elevation. In one embodiment, the detected elevation is transmitted to another device, such as a machine controller associated with machine 110.

At step 708, data is received from IMU 230. In one embodiment, the received data is filtered at step 710 as described in further detail below. At step 712, an elevation of laser detector assembly 100 is calculated based on data from IMU 230 and a prior laser strike (e.g., the initial laser strike detected at step 702). The elevation of laser detector assembly calculated based on data from IMU 230 and a prior laser strike is referred to as an estimated elevation. At step 714, the elevation is output from processor 236 to another device, such as a machine controller associated with machine 110.

At step 716 it is determined if a new laser strike has been detected. If no new laser strike has been detected, the method proceeds to step 708. If a new laser strike has been detected, the method proceeds to step 718. At step 718, an elevation is calculated based on the new laser strike. At step 720, the elevation is output from processor 236 to another device, such as a machine controller associated with machine 110. After step 720, the method proceeds to step 708.

As described above, in one embodiment, method steps 708 to 716 continue to repeat until a new laser strike is detected. Method steps 718 and 720 are performed when a new laser strike is detected and the method then returns to step 708. As such, elevation data calculated based on a prior laser strike and IMU data can be output one or more times during the time between laser strikes.

The frequency of laser strikes is dependent on the rate of rotation of laser beam 128 about the vertical axis of the laser transmitter 140. A typical rotation rate of laser beam 128 about laser transmitter 140 is approximately 600 rotations per minute which results in laser strikes occurring at a frequency of 10 Hz. Sensing movement of laser detector assembly 100 using data from IMU 230 allows an elevation value to be output at a higher frequency than the laser strike frequency since a change in position of the laser strike can be predicted based on data from IMU 230. As such, the frequency at which an elevation value is calculated is independent of laser strike frequency and can be any desired frequency that is supported by the frequency of the receipt of data from IMU 230 and the frequency at which computer 235 can calculate an elevation value.

The frequency at which elevation data is calculated and output from computer 235 is a design choice. In one embodiment, a single elevation value calculated based on a prior laser strike and IMU data is output during the time period between laser strikes. In one embodiment, ten elevation values are calculated based on a prior laser strike and IMU data and are output during the time period between laser strikes. It should be noted that the prior laser strike of step 712 can be either the initial laser strike of step 702 or the new laser strike of step 716.

The phase at which an estimated elevation value is calculated and output from computer 235 with respect to output of a detected elevation is a design choice. In one embodiment, the estimated elevation value is calculated and output out of phase 180 degrees with respect to output of the detected elevation. For example, a detected elevation is calculated and output at times 100 milliseconds, 200 milliseconds, 300 milliseconds, etc. and an estimated elevation is calculated and output at times 150 milliseconds, 250 milliseconds, 350 milliseconds, etc. The phase at which multiple estimated elevation values are output from computer 235 can be based on the frequency of laser strikes and the number of estimated elevation values calculated during the time period between laser strikes.

In one embodiment, Kalman filters are used to fuse the measurements from laser sensor 150 and acceleration of laser sensor 150 detected by IMU 230 with respect to laser beam 128. The fusing of measurements using Kalman filters provides position and movement information pertaining to laser sensor 150. The Kalman filters described herein can be software based, hardware based, or a combination of software and hardware. The purpose of the Kalman filters is to estimate the position and velocity of laser sensor 150 with respect to laser beam 128. This information is used to determine an elevation of laser sensor 150.

In one embodiment, two Kalman filters process data from laser sensor 150 and IMU 230 synchronously at 100 Hz, in order to track the motion of the laser sensor 150 and the laser strike location. The Kalman filter which processes the IMU measurements uses IMU 230 to estimate the location of the laser strike in between actual laser strikes. As described above, in one embodiment, two Kalman filters are used. In other embodiments, fewer than two Kalman filters may be used.

Components described above, for example, in connection with FIG. 3, are shown combined into one housing. In one embodiment, the components shown in FIG. 3 may be located in different housing located apart from each other. For example, in one embodiment, IMU 230 may be located remote from other components and data may be transmitted to computer 235 via wired or wireless connections. Other arrangements may be implemented as well. In another example, the operations of computer 235 may be performed by a machine controller that receives signals from IMU 230 and detector elements of a laser sensor.

Use of multiple sensors and/or types of sensors such as a laser sensor and an IMU can be used to perform sensor fusion. In one embodiment, an IMU is used to identify erroneous laser position information received from a laser sensor. For example, if laser strike data indicates that elevation of the laser detector assembly has changed but IMU data indicates there has been no movement, the laser strike data can be considered erroneous and not used in an elevation calculation. In one embodiment, an IMU is used to identify erroneous laser strike data and output elevation data at the same frequency as the frequency of laser strikes. In one embodiment, an estimated elevation is output in place of a detected elevation when it is determined that the detected laser strike is erroneous (i.e., incorrect based on a prior laser strike and movement data from an IMU). For example, an elevation calculated based on a current laser strike can be compared to an elevation calculated based on movement data from the IMU and a previously detected laser strike. If an elevation value calculated based on the current laser strike does not agree within a threshold of an elevation value calculated based on movement data from the IMU and a previously detected laser strike, the current laser strike can be identified as erroneous and an estimated elevation can be output in place of a detected elevation. In addition to the use of sensor fusion generally, techniques for laser position noise reduction by averaging laser strike data and/or movement data from an IMU can be used as well.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A method comprising:
   calculating an estimated elevation of a laser detector assembly comprising a plurality of laser detector elements, the calculating based on:
   1) data received from an inertial measurement unit comprising at least one accelerometer and at least one gyroscope; and
   2) a detected laser strike detected at one of the plurality of laser detector elements of the laser detector assembly; and
   outputting the estimated elevation.

2. The method of claim 1, further comprising:
   calculating a detected elevation of the laser detector assembly based on the detected laser strike.

3. The method of claim 2, further comprising:
   outputting the detected elevation of the laser detector assembly in response to the detected laser strike.

4. The method of claim 3, wherein the estimated elevation is calculated and output between outputs of detected elevations.

5. The method of claim 4, wherein a frequency at which the estimated elevation is calculated and output is the same frequency at which detected elevations are calculated and output.

6. The method of claim 2, further comprising:
   outputting the estimated elevation in place of the detected elevation in response to determining that a laser strike is erroneous based on a prior laser strike and movement data from the inertial measurement unit.

7. The method of claim 1, wherein the estimated elevation of the laser detector assembly is calculated and output at a frequency higher than a frequency of laser strikes.

8. An apparatus comprising:
   a plurality of laser detector elements;
   an inertial measurement unit comprising at least one accelerometer and at least one gyroscope;
   a memory storing computer program instructions; and
   a processor communicatively coupled to the memory, the plurality of laser detector elements, and the inertial measurement unit, the processor configured to execute the computer program instructions, which, when executed on the processor, cause the processor to perform operations comprising:
   calculating an estimated elevation of a laser detector assembly comprising the plurality of laser detector elements, the calculating based on:
   1) Data received from the inertial measurement unit; and
   2) a detected laser strike detected at one of the plurality of laser detector elements of the laser detector assembly; and
   outputting the estimated elevation.

9. The apparatus of claim 8, the operations further comprising: calculating a detected elevation of the laser detector assembly based on the detected laser strike.

10. The apparatus of claim 9, the operations further comprising: outputting the detected elevation of the laser detector assembly in response to the detected laser strike.

11. The apparatus of claim 10, wherein the estimated elevation is calculated and output between outputs of detected elevations.

12. The apparatus of claim 11, wherein a frequency at which the estimated elevation is calculated and output is the same frequency at which detected elevations are calculated and output.

13. The apparatus of claim 9, the operations further comprising:
    outputting the estimated elevation in place of the detected elevation in response to determining that a laser strike is erroneous based on a prior laser strike and movement data from the inertial measurement unit.

14. The apparatus of claim 8, wherein the estimated elevation of the laser detector assembly is calculated and output at a frequency higher than a frequency of laser strikes.

15. A non-transitory computer readable medium storing computer program instructions, which, when executed on a processor, cause the processor to perform operations comprising:
    calculating an estimated elevation of a laser detector assembly comprising a plurality of laser detector elements, the calculating based on:

1) data received from an inertial measurement unit comprising at least one accelerometer and at least one gyroscope; and
  2) a detected laser strike detected at one of the plurality of laser detector elements of the laser detector assembly; and outputting the estimated elevation.

16. The non-transitory computer readable medium of claim 15, the operations further comprising:
  calculating a detected elevation of the laser detector assembly based on the detected laser strike.

17. The non-transitory computer readable medium of claim 16, the operations further comprising
  outputting the detected elevation of the laser detector assembly in response to the detected laser strike.

18. The non-transitory computer readable medium of claim 17, wherein the estimated elevation is calculated and output between outputs of detected elevations.

19. The non-transitory computer readable medium of claim 18, wherein a frequency at which the estimated elevation is calculated and output is the same frequency at which detected elevations are calculated and output.

20. The non-transitory computer readable medium of claim 16, the operations further comprising:
  outputting the estimated elevation in place of the detected elevation in response to determining that a laser strike is erroneous based on a prior laser strike and movement data from the inertial measurement unit.

* * * * *